United States Patent [19]
Stitt et al.

[11] Patent Number: 5,551,616
[45] Date of Patent: Sep. 3, 1996

[54] PORTABLE VEHICLE ORGANIZING CONTAINER

[75] Inventors: Robert N. Stitt, Kailua-Kona, Hi.; Kenneth Tarlow, Corte Madera, Calif.

[73] Assignee: Robert Stitt, Kaila-Kona, Hi.

[21] Appl. No.: 392,235

[22] Filed: Feb. 22, 1995

[51] Int. Cl.$^6$ .................................................. B60R 7/04
[52] U.S. Cl. ........................ 224/275; 224/539; 224/926; 224/929; 296/37.1; 296/37.15; 220/631
[58] Field of Search .................................. 224/275, 539, 224/541, 926, 929; 296/37.1, 37.15; 220/631

[56] References Cited

U.S. PATENT DOCUMENTS

| 2,160,282 | 5/1939 | Rehg | 224/275 |
|---|---|---|---|
| 4,106,829 | 8/1978 | Dolle et al. | 224/275 |
| 4,146,159 | 3/1979 | Hemmen | 224/275 |
| 4,809,897 | 3/1989 | Wright, Jr. | 224/539 |

FOREIGN PATENT DOCUMENTS

| 2549786 | 2/1985 | France | 224/539 |
|---|---|---|---|
| 5193420 | 8/1993 | Japan | 224/539 |
| 2124189 | 2/1984 | United Kingdom | 224/275 |
| 2223466 | 4/1990 | United Kingdom | 224/275 |
| 2257463 | 1/1993 | United Kingdom | 224/570 |
| 5000361 | 1/1995 | WIPO | 224/275 |

*Primary Examiner*—Henry J. Recla
*Assistant Examiner*—Gregory M. Vidovich

[57] ABSTRACT

A universal vehicle organizing container for automobiles and trucks which sits on the right of a driver, and contains specialized surfaces for holding items necessary for a traveling businessman, such as laptop computer, cellular phone, and more. The container is secured to the seat back by means of a strap which can also act as a carrying means. The inside of the container is insulated and partitioned, so that items may be carried securely, and food items will stay hot or cold longer. The container is connected by dual wires to the vehicle's cigarette lighter socket, and multiple cigarette lighter type adapters are located on the top surface of the container to power electronic devices.

8 Claims, 11 Drawing Sheets

PORTABLE VEHICLE ORGANIZING CONTAINER

BACKGROUND OF THE INVENTION

1. Field of the Invention

This invention relates generally to containers, specifically to a universal organizing container for automobiles and trucks. The container is configured to allow it to be positioned on a passenger seat to allow organization and easy arcess to a variety of items normally carried loosely by travelers, especially business travelers in a car or truck.

2. Prior Art

Containers for holding objects in cars or trucks are known. For example, U.S. Pat. No. 3,391,6S9 relates to a control desk for emergency vehicles, and the placement of control equipment and receptacles for supporting equipment, such as radio microphone and flashlight. A panel is secured to the floor of the vehicle to hold the organizer in place. U.S. Pat. No. 5,282,556 to Bossert also relates to holding specific equipment used in emergency vehicles through the use of a removable container. Another container is described in U.S. Pat. No. 2,931,391 to Bohnett. Bohnett describes an automobile desk having a file cabinet portion and a desktop for a writing surface. The described automobile desk is installed by placement in the front seat of an automobile to the right side of the driver. Extendible feet meet the floor to stabilize the container. Service console trays for use in a vehicle are also known. Such service console trays can be used to hold drinks and small articles, such as pocket change, or provide a trash receptacle. Such service console trays are described in U.S. Pat. No. 4,796,791 to Goss et al. and 3,381,456 to Lipe.

SUMMARY OF THE INVENTION

Today's businessman spends much of his time in his automobile, and because of laptop computers and cellular phones, a person can carry out many business related activities while in the car. My invention makes the use of laptop computer, cellular phone and other electronic devices easy and convenient. Another requirement for the business traveler is to be able to store and eat various foods and beverages while in the car or truck.

Unlike the foregoing vehicle containers, service consoles or writing desks, the present invention is an easily removable container/console specifically designed for today's traveling businessman's needs. The present invention includes an insulated, odor-inhibiting container for storage of foods or other objects, as well as a built-in coffee warmer. In addition, the present invention provides a mechanism for securing the vehicle organizing container in the vehicle.

In preferred embodiments, the container is secured by a strap which wraps around the seat back portion of the passenger seat. The container can also be held in place by the seat belt already provided in the vehicle. The securing strap also acts as a carry handle when transporting the container to and from the vehicle. The present invention also provides receptacles and surfaces for many other commonly used items for the business traveler, including: eyeglass holder, beverage holder, coin holder, pen holder, clipboard, directional compass, cassette and C.D. holder, as well as general receptacles for other small objects.

In summary, the present invention is intended to provide an improved organizing container for vehicles specifically designed for carrying items used by today's business traveler. It has a top surface which will hold a laptop computer, plus multiple cigarette lighter type receptacles for powering electric products. It has a means for holding a cellular phone, light, clipboard, pen and directional compass, as well as other general purpose receptacles. The side portion of the organizing container holds a flip clown electrical coffee warmer. The interior portion of the present vehicle organizing container contains removable dividers for securing a variety of objects or foods, and is insulated so that objects carried within the container stay cool or warm as needed. In short, the present organizing container for vehicles act as a businessman's office while in his automobile or truck. Additional features and advantages of this invention will become apparent to those skilled in the art upon consideration of the following detailed description of preferred embodiments exemplifying the best mode of carrying out the invention as presently perceived.

DETAILED DESCRIPTION OF THE INVENTION

Figure 1:
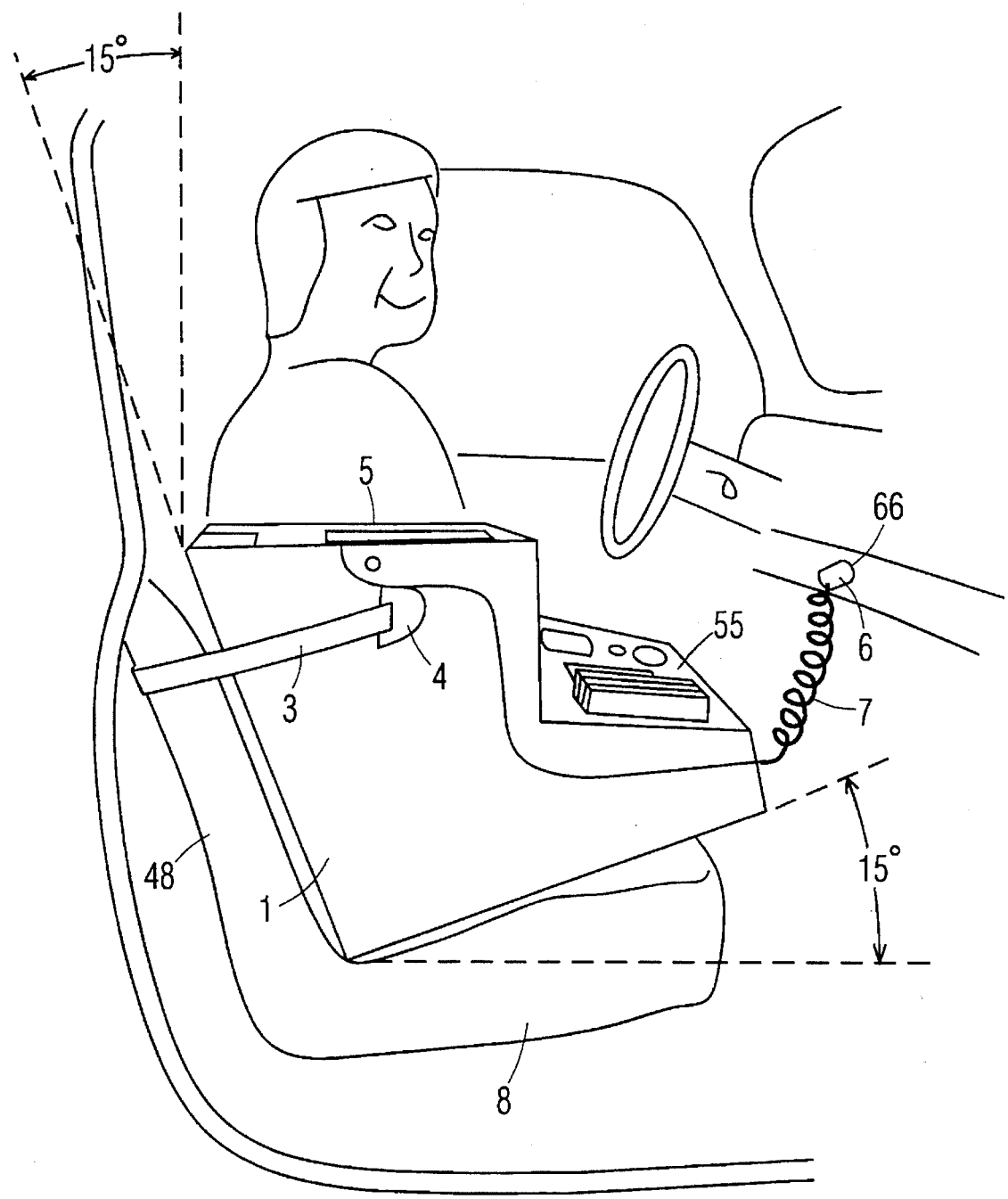
FIG. 1 shows a side view of the vehicle organizing container with retaining strap in place.

FIG. 1 shows a side view of vehicle organizing container 1. The container 1 sits on passenger seat 8. Almost all vehicle passenger seats have an downward tilting angle of approximately 15 degrees. The seat back 48 also tilts back about 15 degrees. So the vehicle organizing container 1 matches the angles of seat 8 and seat back 48. The top surface 5 and lower top surface 55 are then oriented in a horizontal position with respect to the floor of the vehicle. Rotatable pivot joint 4 holds one end of the strap 3. Strap 3 wraps around seat back 48 to hold container 1 in place. Organizing container 1 has a power cord 7 with a plug 6 that plugs into a cigarette lighter socket 66 of the vehicle.

Figure 2:
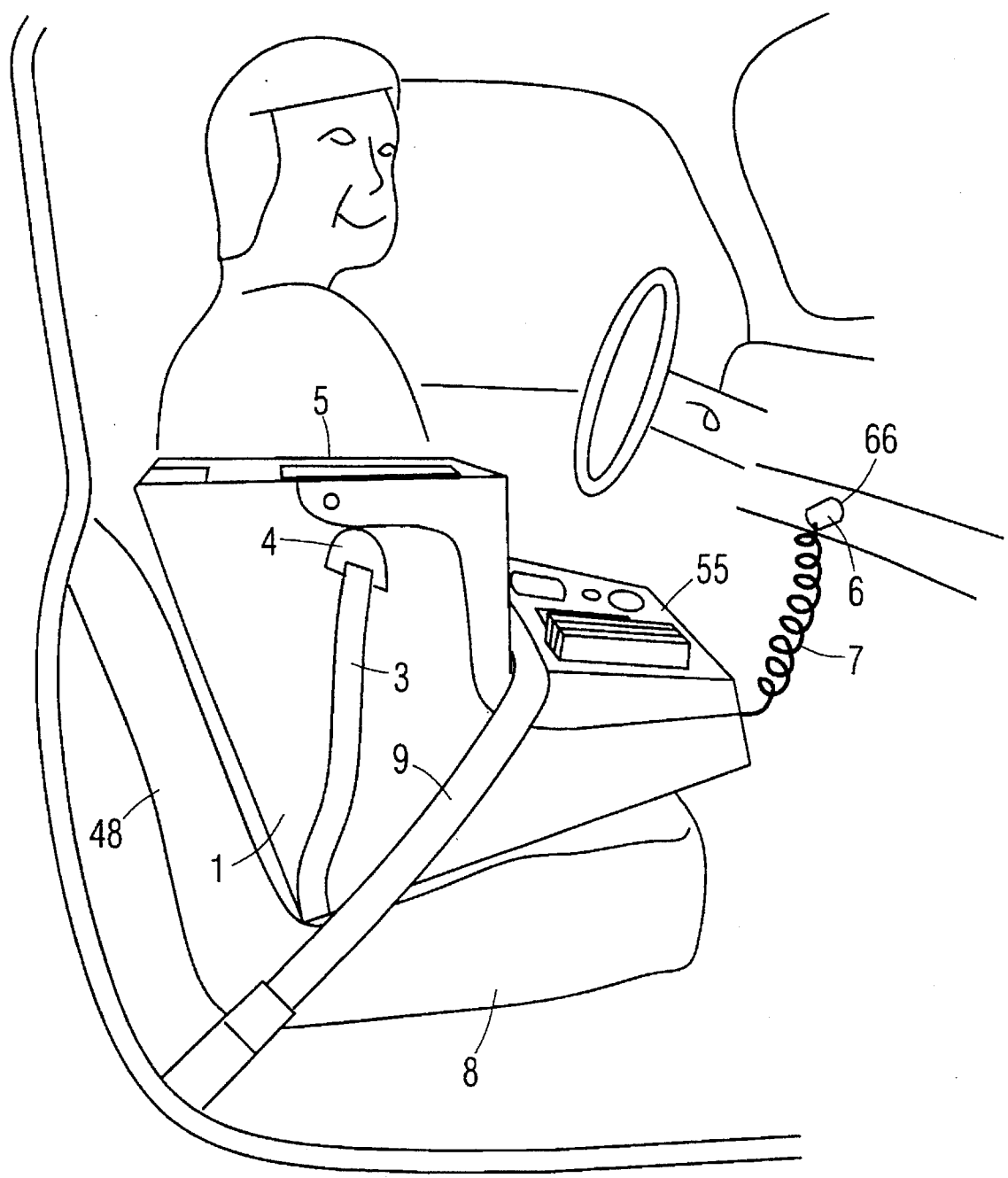
FIG. 2 shows a side view of the vehicle organizing container with vehicle's seat belt retaining the container.

FIG. 2 shows vehicle organizing container 1 being restrained by an alternative method. Vehicle seat belt 9 straps over lower top surface 55, and seat belt 9 is clipped into a standard vehicle clip receptacle.

Figure 3:
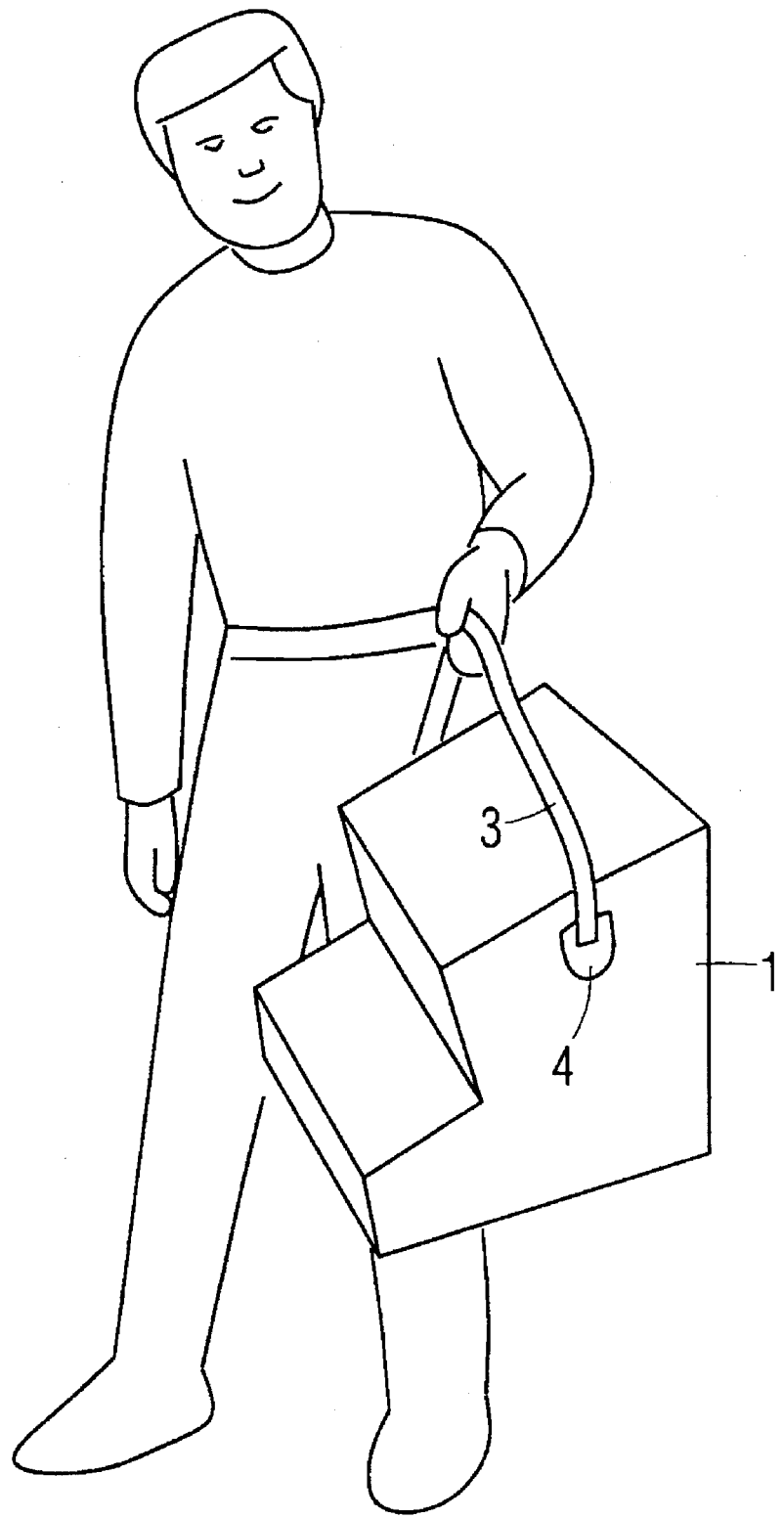
FIG. 3 shows a person carrying the vehicle organizing container by it's carry strap.

FIG. 3 shows a person carrying the vehicle organizing container by strap 3. Pivoting bracket 4 swivels up to accommodate the carrying mode. It is noted that some structure of the container has been removed from the figure to facilitate illustration.

Figure 4:
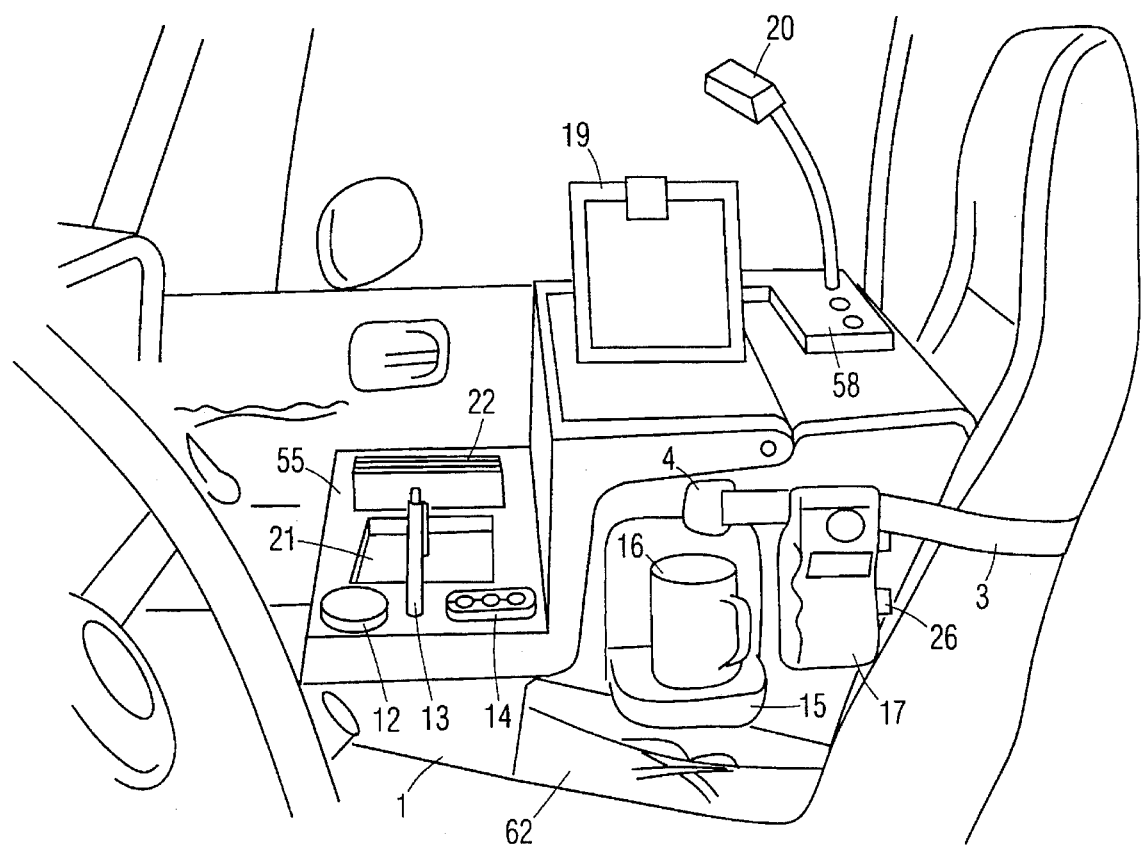
FIG. 4 shows a perspective view of the vehicle organizing container in use.

FIG. 4 shows a perspective view of the vehicle organizing container in use. Electric coffee cup warmer 15 is folded out and mating coffee cup 16 is in place. Easel back 19 is in a raised position. Light 20 is plugged into cigarette lighter type receptacle 58. Cellular phone 17 is cradled in spring fingers 26. Compass 12, pen 13, coin holder 14, CD holder 22, and tape holder 21 are all mounted on lower top surface 55. Flexible pocket 62 is mounted on the side of the container 1 below the coffee warmer 15.

Figure 5:
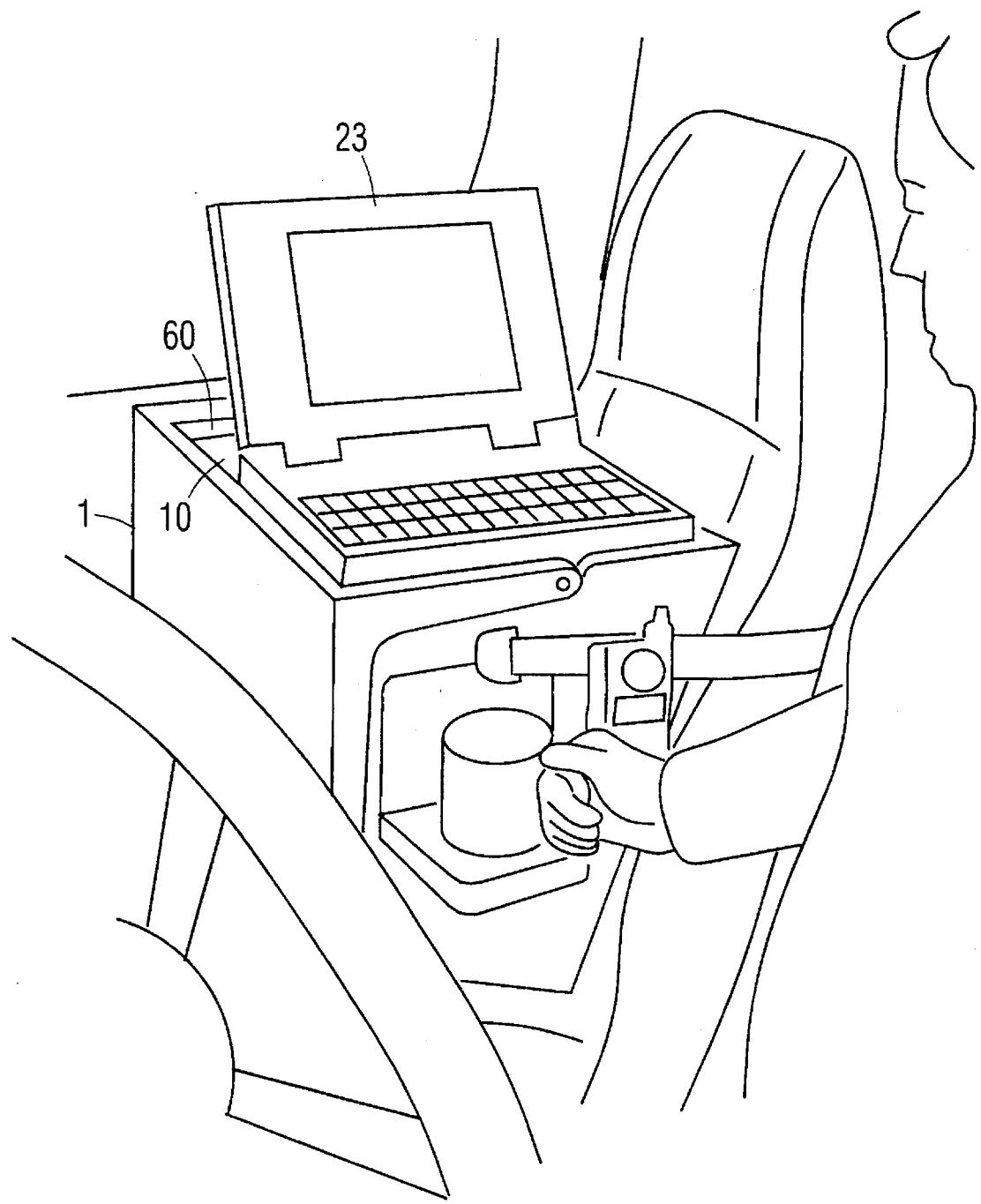
FIG. 5 shows how a lap top computer fits on top of the vehicle organizing container.

FIG. 5 shows vehicle organizing container 1 with laptop computer 23 in place on top surface 10. The laptop computer 23 is retained by retaining wall 60 so that it can not fall off during travel. Top surface 10 is wide enough so that computer 23 can be oriented in an easy to use position which is at 90 degrees to the body of the driver.

Figure 6:
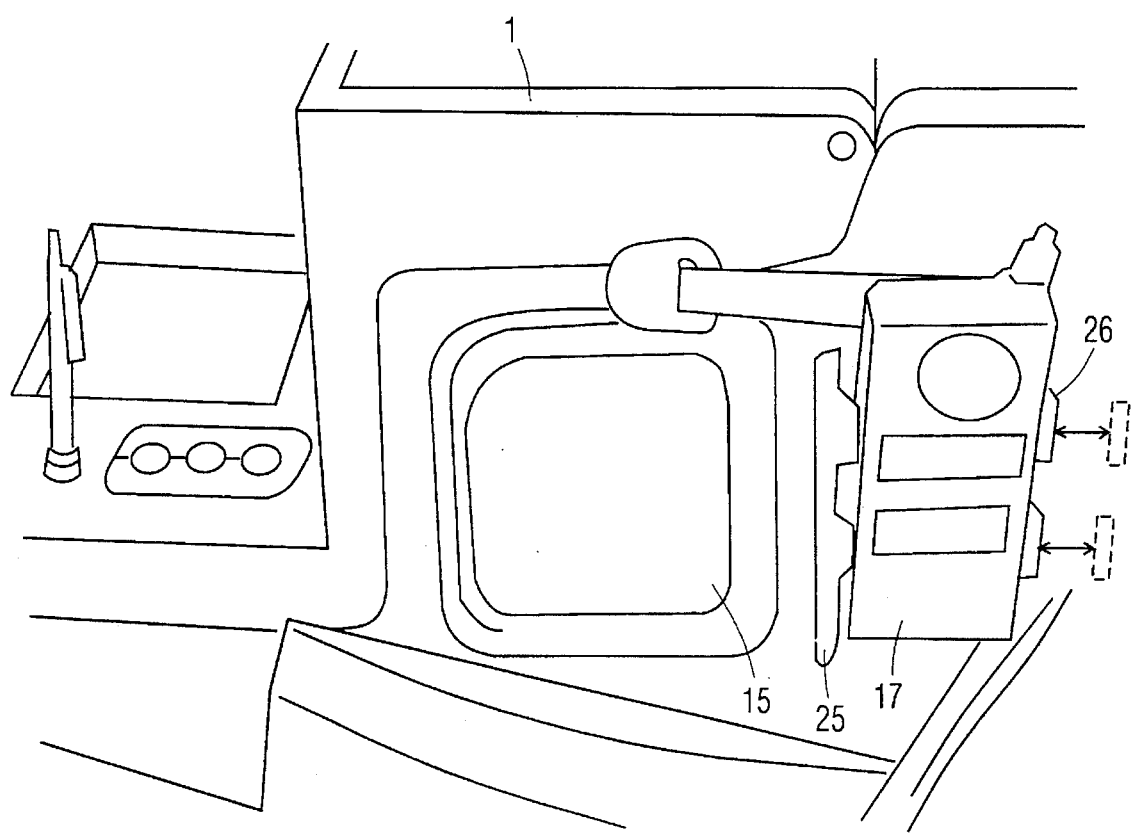
FIG. 6 shows a side view of the vehicle organizing container, highlighting the fold-out coffee warmer and the cellular phone holder.

FIG. 6 shows the coffee warmer 15 in the folded up position. Cellular phone holder 25 has spring fingers 26 which accommodate various sizes of phones.

Figure 7:
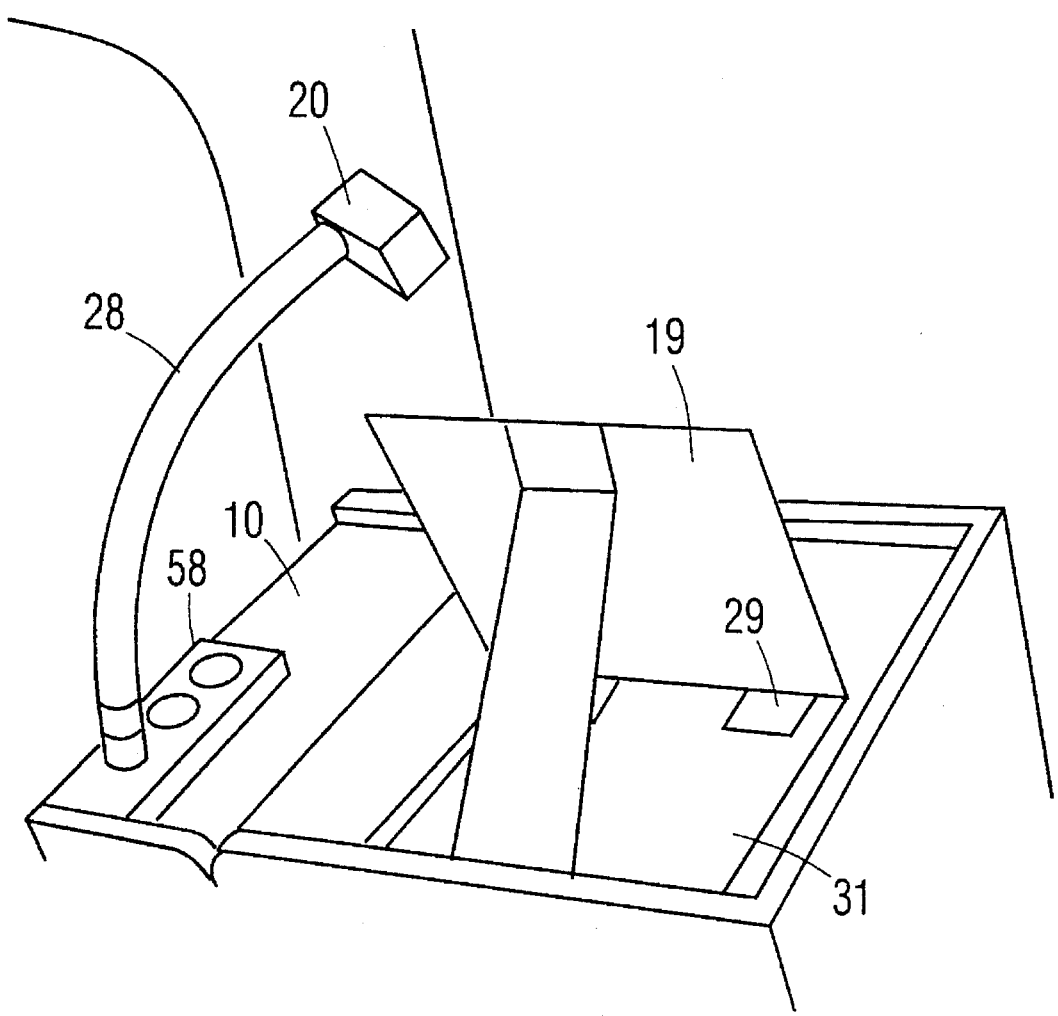
FIG. 7 shows multiple cigarette lighter type receptacles located on the top surface of the vehicle organizing container.

FIG. 7 shows top surface 10 of the vehicle organizing container. Multiple cigarette lighter type receptacles 58 can be used to connect power to a variety of electrically run devices, including lamp 20, which is connected to socket 58 by flexible neck 28. Clip board type easel 19 is shown in the up position, and is connected to top surface 10 by hinge 29. Depression 31 receives easel 19, so that when easel 19 is in a down position, as in FIG. 8, it is flush with top surface 10.

Figure 8:
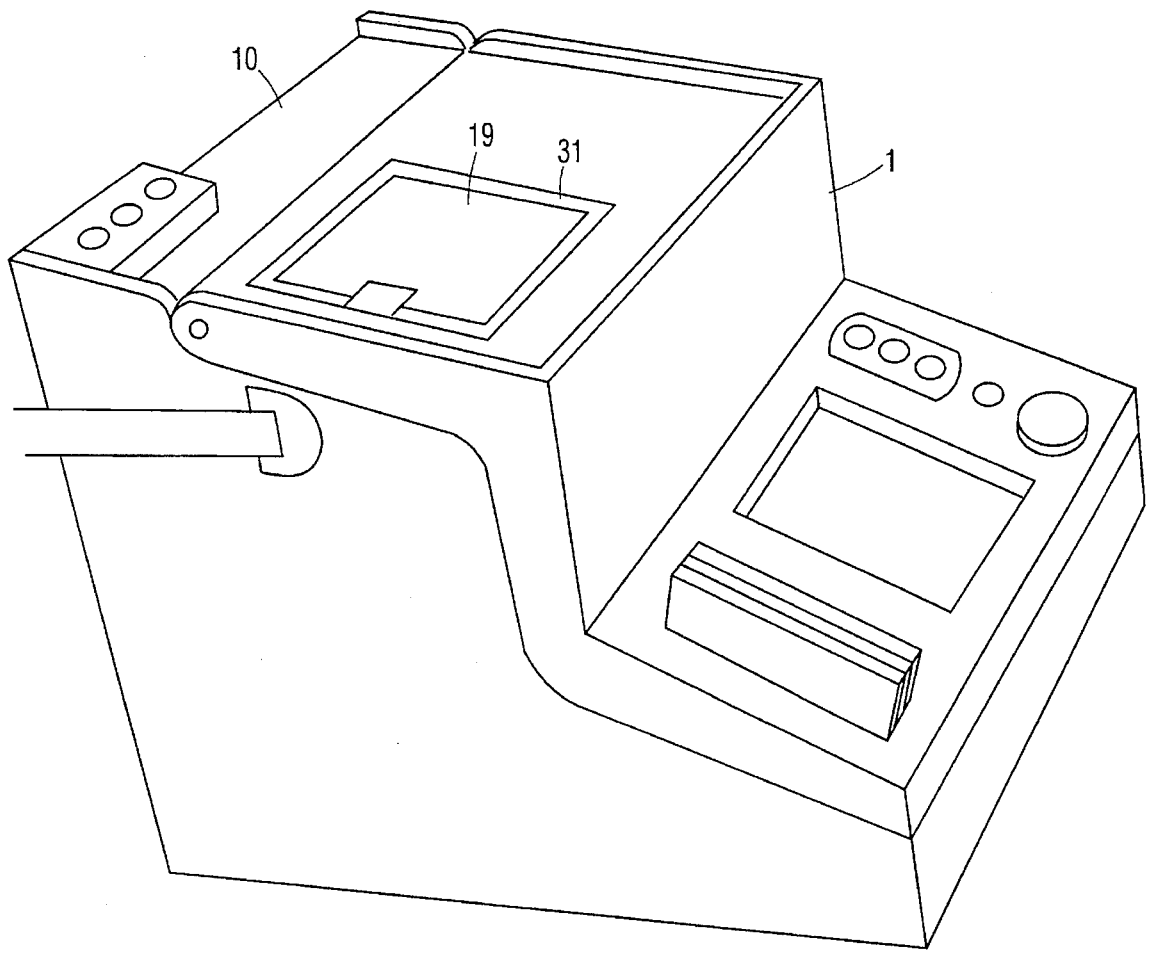
FIG. 8 shows the integral easel type clipboard located on the top surface of the vehicle organizing container in a closed position.

FIG. 8 shows clip board 19 in it is folded in a down position, nesting in depression 31, so that clipboard 19 is flush with top surface 10.

Figure 9:
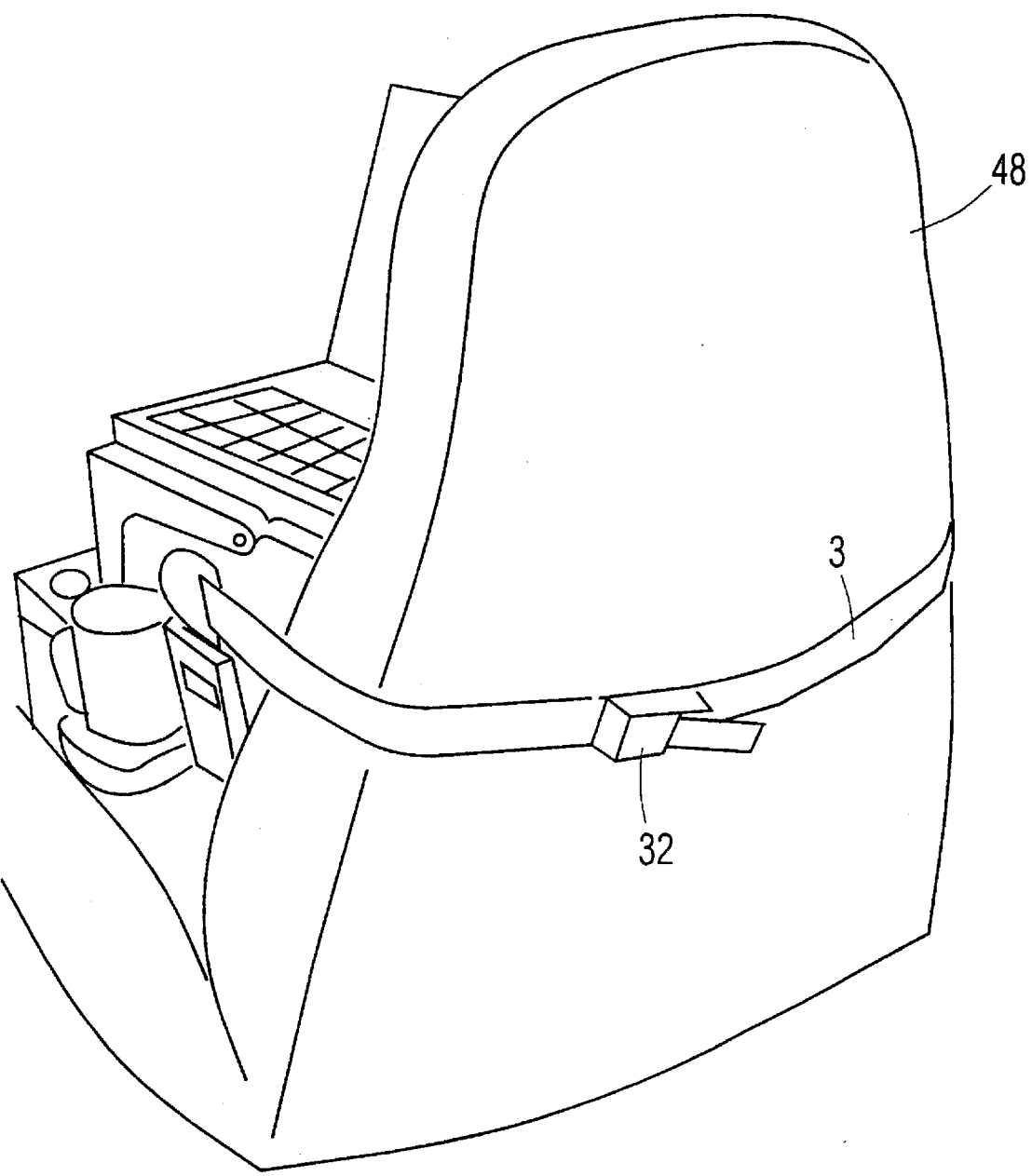
FIG. 9 shows the retaining strap of the vehicle organizing container.

FIG. 9 shows strap 3 wrapped completely around seat back 48 and fastened by buckle 32.

Figure 10:
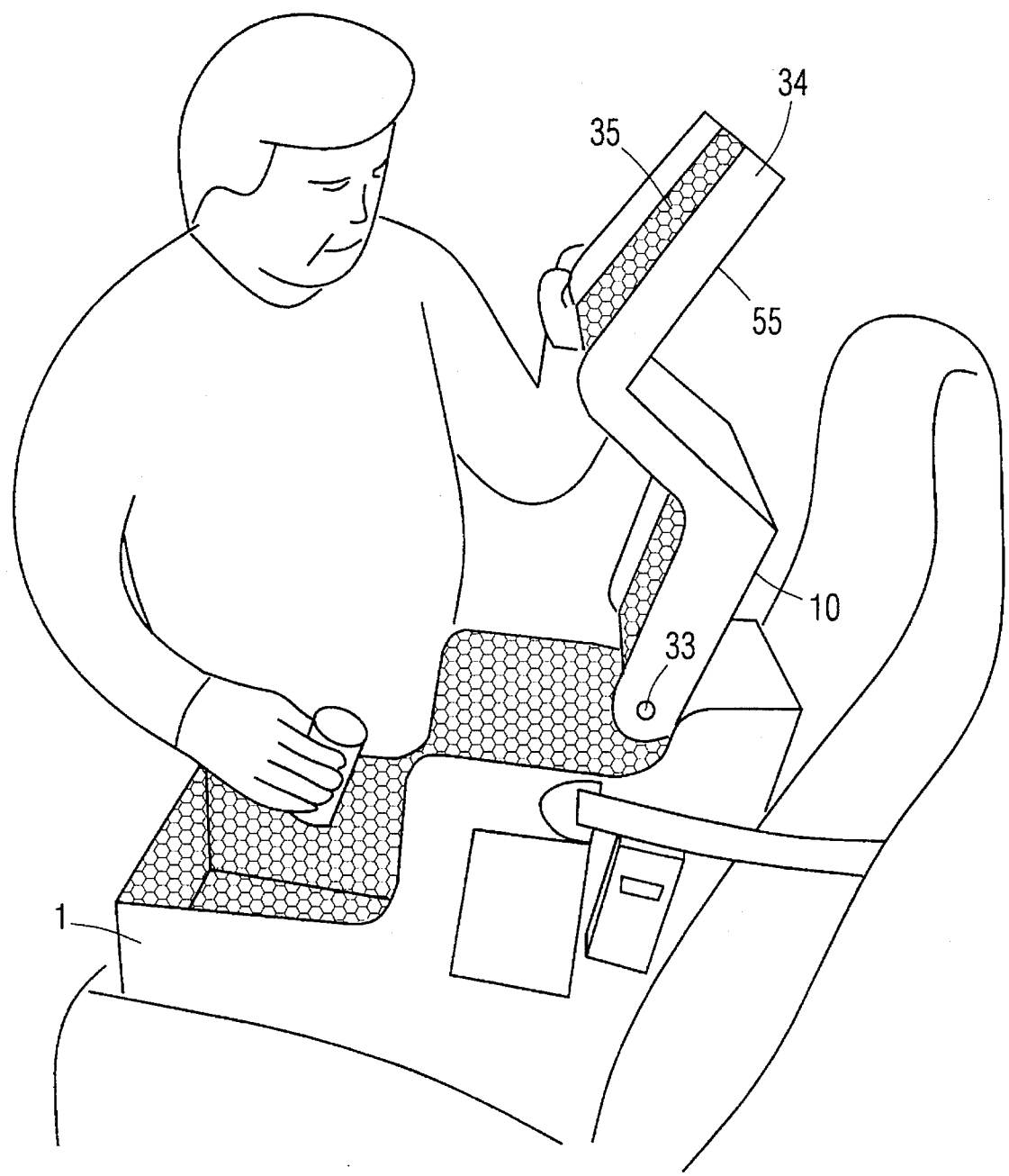
FIG. 10 shows a person putting objects into the vehicle organizing container.

FIG. 10 shows a person opening the vehicle organizing container. Part of the top surface 10 and all of the lower top surface 55 form a lid 34, which swings upwardly about hinge pin 33. The interior of the container 1 is lined with insulating double walled bubble type plastic sheeting 35, allowing contents of container 1 to stay warm or cold. Since the entire container is relatively air tight, food odors can not escape from the container.

Figure 11:
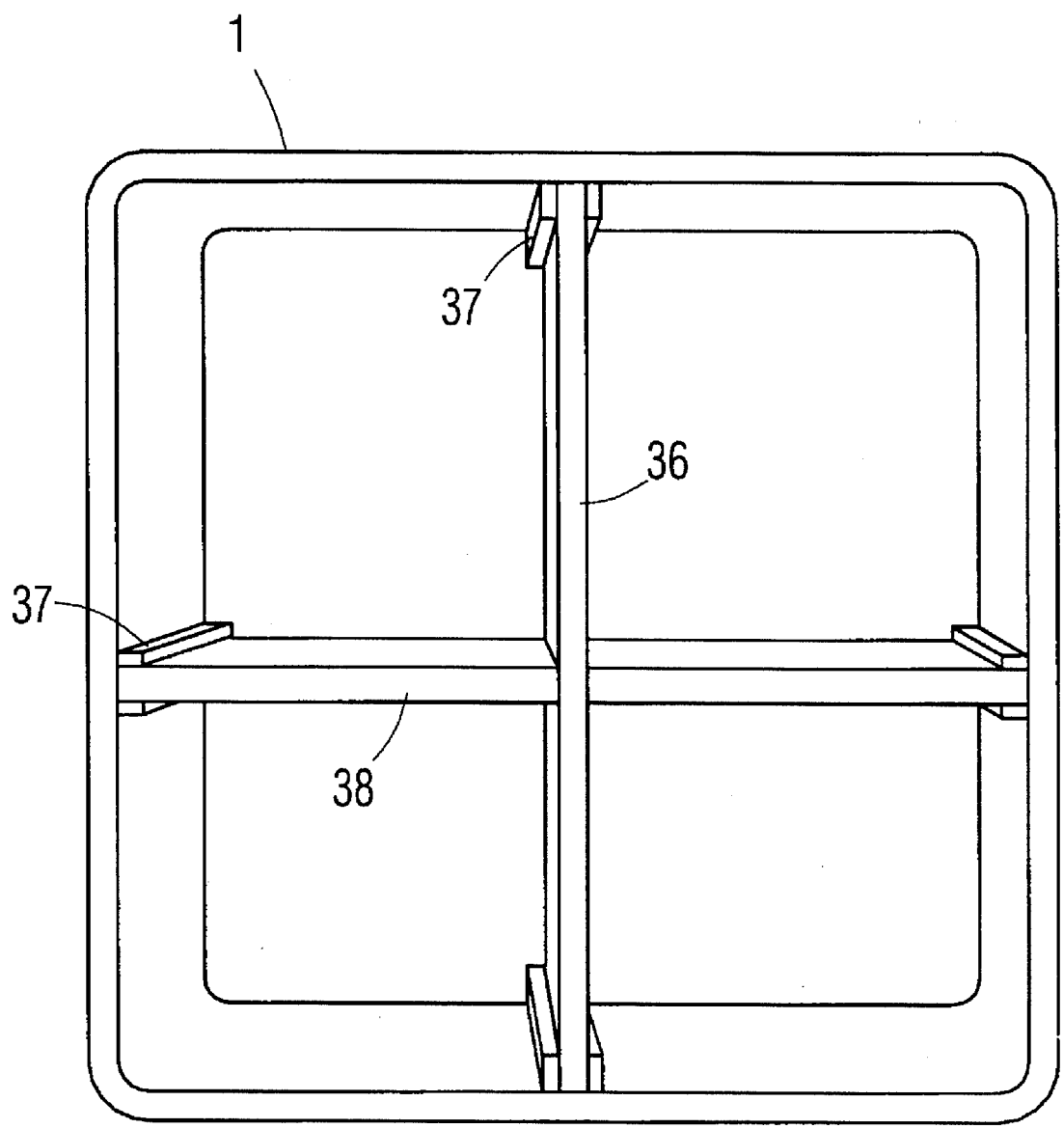
FIG. 11 shows a top view of the removable partitions in the vehicle containing organizer.

FIG. 11 is a top view of the inside of vehicle organizing container 1. Removable partitions 36 and 38 slide into U-shaped channels 37. Partitions 36 and 38 can be used one at a time, or they can be removed completely to create a space large enough to hold a large pizza box.

What is claimed is:

1. A vehicle organizing container adapted for use in a vehicle having a seat inclined approximately 15 degrees with respect to a horizontal plane, said container comprising:

a base, upstanding side walls and an upper surface forming an enclosure having an interior thereof;

said upper surface comprising a first panel and a vertically stepped cover member having a second panel and a third panel lower than said second panel and coupled therebetween by a substantially vertical panel, said first and second panels being hinged together to form a higher top surface and said third panel forming a lower top surface wherein upon upward pivotal movement of said cover member about said hinge between a closed position and an open position, half of said higher top surface and all of said lower top surface pivot upwardly to allow access to said interior; and said base being inclined approximately 15 degrees relative to the horizontal plane such that when said base is set on the seat of the vehicle, said higher and lower top surfaces are substantially parallel with the horizontal plane.

2. The vehicle organizing container of claim 1, further including a retaining wall arranged on said higher top surface, said retaining wall being adapted for preventing an object placed thereon from sliding off.

3. The vehicle organizing container of claim 1, further including a clipboard hingeably attached to said higher top surface.

4. The vehicle organizing container of claim 1, further including a strap having opposite ends hingeably attached to said side walls, said strap selectively being adapted for strapping around said seat of said vehicle for securing said container being usable as a carrying strap.

5. The vehicle organizing container of claim 1, further including a plurality of cigarette lighter receptacles arranged on said vehicle organizing container, said cigarette lighter receptacles being adapted for powering electronic equipment.

6. The vehicle organizing container of claim 1, further including a foldable coffee warmer pivotally attached to one of said side walls.

7. The vehicle organizing container of claim 1, further including an insulating liner arranged in said interior.

8. The vehicle organizing container of claim 1, further including a pair of partitions removably arranged in said interior.

* * * * *